United States Patent
Yan et al.

(10) Patent No.: US 11,581,831 B2
(45) Date of Patent: Feb. 14, 2023

(54) METHOD FOR BRAKING PERMANENT MAGNET SYNCHRONOUS MOTOR AND RELATED DEVICE

(71) Applicant: AUTEL ROBOTICS CO., LTD., Guangdong (CN)

(72) Inventors: Shizhi Yan, Guangdong (CN); Yidong Chen, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 921 days.

(21) Appl. No.: 16/415,470

(22) Filed: May 17, 2019

(65) Prior Publication Data

US 2019/0273453 A1 Sep. 5, 2019

Related U.S. Application Data

(63) Continuation of application No. PCT/CN2017/111681, filed on Nov. 17, 2017.

(30) Foreign Application Priority Data

Nov. 18, 2016 (CN) .......................... 201611041815.X

(51) Int. Cl.
*H02P 3/14* (2006.01)
*H02P 3/18* (2006.01)
(Continued)

(52) U.S. Cl.
CPC ................ *H02P 3/14* (2013.01); *B64D 31/12* (2013.01); *H02P 3/18* (2013.01); *H02P 5/74* (2013.01); *H02P 6/24* (2013.01); *H02P 2207/05* (2013.01)

(58) Field of Classification Search
CPC ...... H02P 3/14; H02P 3/18; H02P 5/74; H02P 6/24; H02P 2207/05; B64D 31/12
See application file for complete search history.

(56) References Cited

U.S. PATENT DOCUMENTS 5,350,985 A * 9/1994 Konrad .................. B60L 7/006
318/370
6,288,508 B1 * 9/2001 Taketomi ................ B60L 50/52
318/139
(Continued)

FOREIGN PATENT DOCUMENTS

CN    1520021 A    8/2004
CN  102055394 A    5/2011
(Continued)

OTHER PUBLICATIONS

The international Search Report and Written Opinion dated Jan. 31, 2018; PCT/CN2017/111681.
(Continued)

*Primary Examiner* — Thai T Dinh

(57) ABSTRACT

The present disclosure discloses a method for braking a permanent magnet synchronous motor and a related device. The method is applied to an electronic speed controller and includes: receiving a signal for braking the permanent magnet synchronous motor sent by a flight controller; sending a first control signal to the permanent magnet synchronous motor, the first control signal being used to control the permanent magnet synchronous motor to decrease its rotational speed to a preset rotational speed range within a first preset time period; and after the first preset time period ends, sending a second control signal to the permanent magnet synchronous motor, the second control signal being used to control the permanent magnet synchronous motor to stop rotating within a second preset time period. According to the method, consistency of shutdown of multiple motors is ensured, and use experience of a drone is improved.

17 Claims, 6 Drawing Sheets

(51) Int. Cl.
     *H02P 6/24*        (2006.01)
     *H02P 5/74*        (2006.01)
     *B64D 31/12*      (2006.01)

(56) References Cited

U.S. PATENT DOCUMENTS

| | | | |
|---|---|---|---|
| 9,787,231 B2 * | 10/2017 | Katayama | H02P 6/24 |
| 9,979,331 B2 * | 5/2018 | Lee | H02P 29/0241 |
| 2008/0112695 A1 * | 5/2008 | Kanamori | H02P 6/18 |
| | | | 388/811 |
| 2015/0084557 A1 * | 3/2015 | Nishi | H02P 1/029 |
| | | | 318/400.11 |
| 2015/0097510 A1 * | 4/2015 | Katayama | H02P 6/24 |
| | | | 318/721 |
| 2015/0326154 A1 * | 11/2015 | Benson | B60L 58/22 |
| | | | 318/400.22 |
| 2018/0183363 A1 * | 6/2018 | Sakamoto | H02P 3/12 |

FOREIGN PATENT DOCUMENTS

| | | | |
|---|---|---|---|
| CN | 204425215 U | * | 6/2015 |
| CN | 204425215 U | | 6/2015 |
| CN | 105480116 A | | 4/2016 |
| CN | 105656382 A | | 6/2016 |
| CN | 106655921 A | | 5/2017 |
| JP | 06165547 A | | 6/1994 |
| JP | 2000-209892 A | | 7/2000 |
| JP | 2015-162945 A | | 9/2015 |

OTHER PUBLICATIONS

The Third Chinese Office Action dated Dec. 3, 2019; Appln. No. 201611041815.X.

\* cited by examiner

METHOD FOR BRAKING PERMANENT MAGNET SYNCHRONOUS MOTOR AND RELATED DEVICE

CROSS REFERENCE

The present application is a continuation of International Application No. PCT/CN2017/111681, filed on Nov. 17, 2017, which claims priority to Chinese Patent Application No. 201611041815.X, filed with the Chinese Patent Office on Nov. 18, 2016 and entitled "METHOD FOR BRAKING PERMANENT MAGNET SYNCHRONOUS MOTOR AND RELATED DEVICE", both of which are incorporated herein by reference in their entireties.

BACKGROUND

Technical Field

The present application relates to the field of drones, and in particular, to a method for braking a permanent magnet synchronous motor and a related device.

Related Art

Currently, an unmanned aerial vehicle (UAV), referred to as a drone for short, by controlling rotational speeds of multiple motors, makes propellers connected to the multiple motors generate a lifting force to implement flight. When the drone is shut down, a power source is turned off, the rotational speeds of the multiple motors gradually decrease based on inertia. Consequently, the propellers connected to the multiple motors gradually stop rotating.

In this case, because the motors are located at different positions, the propellers connected to the motors are located at different positions, air resistance and others, such as frictional resistance, applied to the propellers vary. Consequently, it cannot be ensured that the multiple propellers synchronously stop rotating when observed with naked eyes.

Generally, the propellers successively stop rotating, and consequently, use experience of the drone is lowered.

In addition, in this case, because processes of the motors stopping rotation are inconsistent, an abrasion difference between the motors increases after the motors are used for a long period. There is a risk of breaking flight balance of the drones.

SUMMARY

Implementations of the present invention provide a method for braking a permanent magnet synchronous motor and a related device. Consistency of shutdown of multiple motors is ensured, and use experience of a drone is improved.

According to a first aspect, an embodiment of the present application provides a method for braking a permanent magnet synchronous motor. The method may include:

receiving a signal for braking a permanent magnet synchronous motor sent by a flight controller; sending a first control signal to the permanent magnet synchronous motor, the first control signal being used to control the permanent magnet synchronous motor to decrease its rotational speed to a preset rotational speed range within a first preset time period; and after the first preset time period ends, sending a second control signal to the permanent magnet synchronous motor, the second control signal being used to control the permanent magnet synchronous motor to stop rotating within a second preset time period.

According to a second aspect, an embodiment of the present application provides an apparatus for braking a permanent magnet synchronous motor. The apparatus includes functional units, configured to perform the method according to the first aspect.

According to a third aspect, an embodiment of the present application provides an electronic speed controller, including:

a memory; and a processor coupled to the memory, where the memory is configured to store computer instructions; and the processor is configured to invoke the computer instructions, to perform the method according to the first aspect.

According to a fourth aspect, an embodiment of the present application provides a drone, including:

a central housing;

an arm, connected to the central housing;

a permanent magnet synchronous motor, disposed on the arm;

a flight controller, disposed in the central housing or the arm; and an electronic speed controller, disposed in the central housing or the arm, electrically connected to the flight controller, and electrically connected to the permanent magnet synchronous motor, where the flight controller is configured to send a signal for braking the permanent magnet synchronous motor to the electronic speed controller; and the electronic speed controller is configured to perform the method in the first aspect.

According to a fifth aspect, an embodiment of the present application provides a computer readable storage medium, storing computer instructions. The computer instructions are used to be invoked by an electronic speed controller to perform the method according to the first aspect.

In the embodiments of the present application, after receiving a signal for braking multiple permanent magnet synchronous motors sent by the flight controller, the electronic speed controller may send a first control signal to a permanent magnet synchronous motor of the multiple permanent magnet synchronous motors. The first control signal may be used to control the permanent magnet synchronous motor to decrease its rotational speed to the preset rotational speed range within the first preset time period. After the first preset time period ends, the electronic speed controller may further send a second control signal to the permanent magnet synchronous motor. The second control signal may be used to control the permanent magnet synchronous motor to stop rotating within the second preset time period. According to the foregoing manner, consistency of shutdown of multiple motors can be ensured.

DETAILED DESCRIPTION

According to a method for braking a permanent magnet synchronous motor, an electronic speed controller, and a drone for implementing the method for braking a permanent magnet synchronous motor that are provided in the embodiments of the present application, motors are controlled in two phases, so that propellers connected to the controlled motors synchronously stop rotating when observed with naked eyes, thereby ensuring consistency of shutdown of multiple motors and improving use experience of a drone.

The embodiments of the present application are described below with reference to the accompanying drawings.

Figure 1:
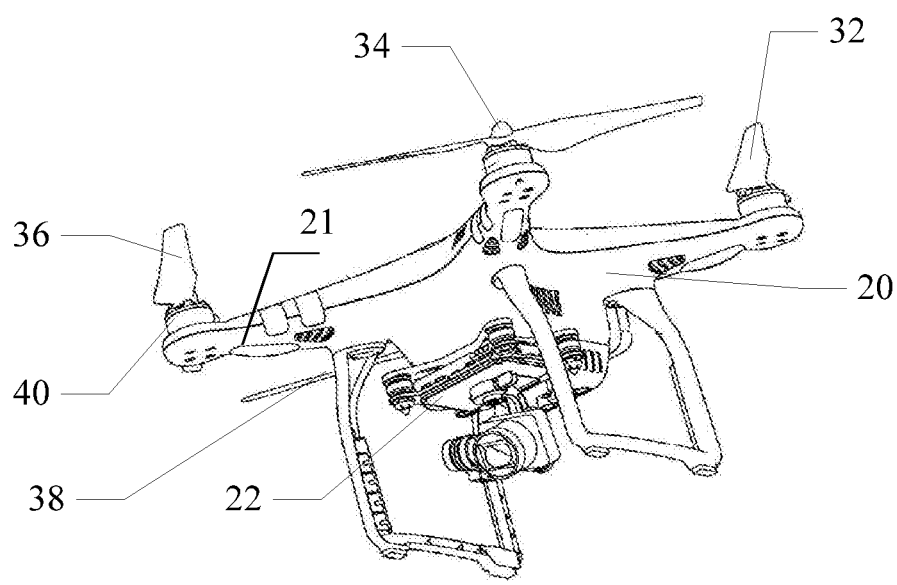
FIG. 1 is a schematic structural diagram of a drone according to an embodiment of the present application.
Figure 1:
Figure 1:
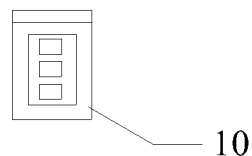
Figure 3:
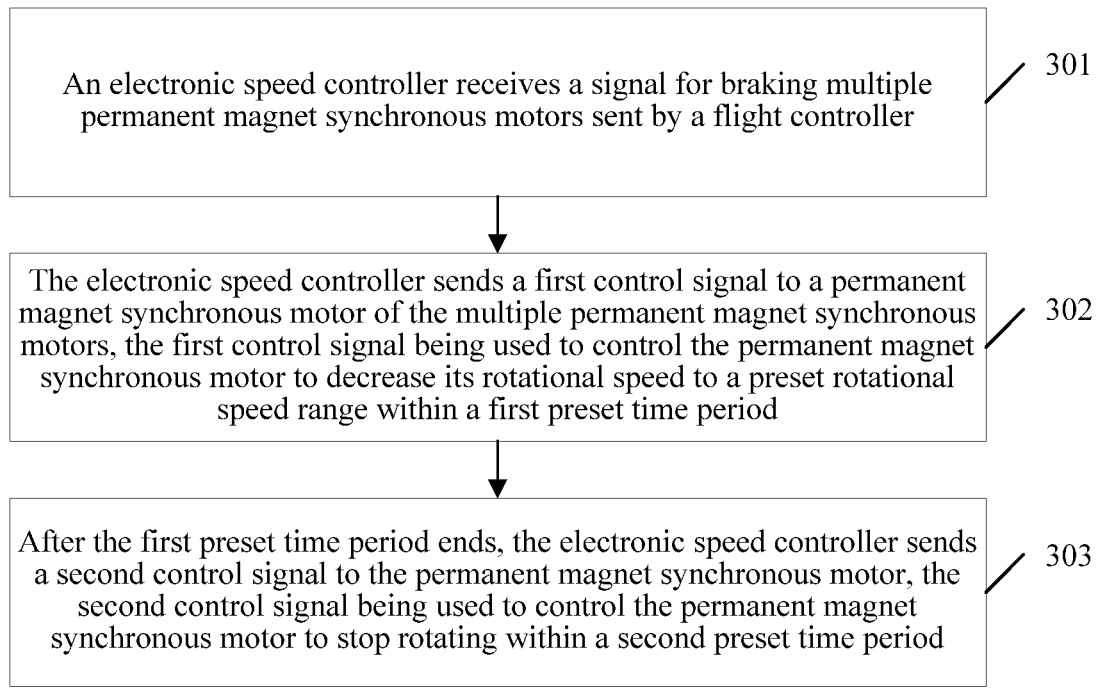
FIG. 3 is a schematic flowchart of a method for braking a permanent magnet synchronous motor according to an embodiment of the present application.

First, referring to FIG. 1 and FIG. 3, structural composition of a drone according to an embodiment of the present application is described. As shown in FIG. 1, the drone may include a drone body 20, an arm 21, propellers 32-38, a permanent magnet synchronous motor, a flight controller and an electronic speed controller (ESC).

The drone body 20 is connected to the arm 21. A permanent magnet synchronous motor is disposed on each arm 21, and each permanent magnet synchronous motor is connected to a propeller. For example, as shown in FIG. 1, a permanent magnet synchronous motor 40 is disposed on the arm 21, and the permanent magnet synchronous motor 40 is connected to the propeller 36. After being rotated, the permanent magnet synchronous motor may drive the propeller to rotate, to make the propeller generate a lifting force. It can be understood that a rotational speed of the propeller may usually keep consistent with a rotational speed of the permanent magnet synchronous motor.

The flight controller and the electronic speed controller are disposed in the drone body 20 or the arm 21 and are not shown in the figure. The flight controller is electrically connected to the electronic speed controller, and the electronic speed controller is electrically connected to the permanent magnet synchronous motor. The flight controller may send a flight signal or a braking signal to the electronic speed controller, and the electronic speed controller may control the rotational speed of the permanent magnet synchronous motor according to the signal sent by the flight controller. For example, the flight controller sends a control signal to the motor. For a specific implementation of controlling the permanent magnet synchronous motor by the electronic speed controller, refer to the following method embodiments.

The electronic speed controller may correspond to one or more permanent magnet synchronous motors. That is, the electronic speed controller may control a rotational speed of a permanent magnet synchronous motor. For example, assuming that the drone is provided with four permanent magnet synchronous motors for driving propellers, the drone may be equipped with four electronic speed controllers, and each electronic speed controller corresponds to a permanent magnet synchronous motor. Alternatively, the electronic speed controller may simultaneously control rotational speeds of multiple permanent magnet synchronous motors. For example, assuming that the drone is provided with four permanent magnet synchronous motors for driving propellers, the drone may be equipped with one electronic speed controller, and the electronic speed controller is configured to control the four permanent magnet synchronous motors. This is not limited herein.

Optionally, the drone may further include a gimbal 22. The gimbal 22 may be connected to a camera, and is configured keep the camera stable, thereby ensuring stability of image shooting by the camera.

The drone may further include a wireless communications interface, and the drone may implement wireless connection and communication with a remote control 10 by using the wireless communications interface.

For example, the communications interface of the drone receives a shutdown instruction sent by the remote control. The communications interface may send the shutdown instruction to the flight controller in the drone. An instruction for braking the permanent magnet synchronous motor may be sent to the electronic speed controller according to the shutdown instruction, so that the electronic speed controller regulates the speed of the permanent magnet synchronous motor according to the braking instruction, that is, controls the permanent magnet synchronous motor to decrease its rotational speed.

It should be noted that the shape of the drone and positions of components that are shown in FIG. 1 are merely exemplary and are not limited herein.

The method embodiment in the embodiments of the present application is described below with reference to the foregoing drone structure.

Step 301: An electronic speed controller receives a signal for braking a permanent magnet synchronous motor sent by a flight controller.

The braking signal sent by the flight controller is used to synchronously brake multiple, that is, at least two, permanent magnet synchronous motors. That is, the flight controller indicates that the multiple permanent magnet synchronous motors can implement synchronous shutdown or make propellers synchronously become static when observed with naked eyes.

Optionally, the braking signal may further be used to indicate a braking mode. That is, different braking signals correspond to different braking modes. After receiving the braking signal, the electronic speed controller may determine a braking mode for the permanent magnet synchronous motor. The braking mode may include dynamic braking, regenerative braking and the like. Further, the electronic speed controller may determine different first control signals and second control signals, according to different braking modes indicated by braking signals.

Optionally, the braking signal may further be used to indicate whether to synchronously brake multiple permanent magnet synchronous motors. If the braking signal indicates that the multiple permanent magnet synchronous motors can be synchronously braked, step 302 may be performed. If the braking signal does not indicate that the multiple permanent magnet synchronous motors can be synchronously braked, or the braking signal indicates that the multiple permanent magnet synchronous motors are not synchronously braked, the electronic speed controller may stop providing currents to the permanent magnet synchronous motors. Consequently, the permanent magnet synchronous motors gradually decrease their rotational speeds based on inertia. Alternatively, the electronic speed controller provides control signals to the permanent magnet synchronous motors, so that braking torques are generated in the permanent magnet synchronous motors based on the control signals. Under action of the braking torques, the permanent magnet synchronous motors gradually decrease their rotational speeds, so as to control braking of the permanent magnet motors by using the electronic speed controller.

Step 302: The electronic speed controller sends a first control signal to the permanent magnet synchronous motor, the first control signal being used to control the permanent magnet synchronous motor to decrease its rotational speed to a preset rotational speed range within a first preset time period.

Exemplarily, after receiving the braking signal, if the electronic speed controller controls two or more permanent magnet synchronous motors of the foregoing multiple permanent magnet synchronous motors, the electronic speed controller simultaneously sends the first control signal to the two or more permanent magnet synchronous motors. Further, rotational speeds of the two or more permanent magnet synchronous motors may be controlled to be decreased to the preset rotational speed range within the first preset time period, so that a first stage of synchronous braking of the motors is implemented. If each electronic speed controller controls one of the multiple permanent magnet synchronous motor, the electronic speed controllers may send the first control signal to the permanent magnet synchronous motors controlled by the electronic speed controller at the same time, so as to control the rotational speeds of the permanent magnet synchronous motors to be decreased to the preset rotational speed range within the first preset time period. The time may be preset or indicated by the flight controller, and is not limited herein.

Exemplarily, the first control signal may be a pulse width modulation (PWM) signal, a pulse phase modulation (PPM) signal, or the like, and is not limited herein.

Optionally, a duty cycle of the first control signal may be determined according to the first preset time period and the preset rotational speed range. That is, the electronic speed controller may achieve, by determining the duty cycle of the first control signal, an effect that the rotational speed of the permanent magnet synchronous motor is decreased to the preset rotational speed range. In this case, the duty cycle of the first control signal may be preset, and the electronic speed controller determines the first control signal by invoking a preset duty cycle parameter.

Alternatively, the duty cycle of the first control signal may be determined according to an initial rotational speed before the permanent magnet synchronous motor is controlled by the control signal, the first preset time period and a first preset rotational speed range. Specifically, after receiving the braking signal sent by the flight controller, the electronic speed controller detects the rotational speed of the permanent magnet synchronous motor. The rotational speed may be understood as the initial rotational speed. The electronic speed controller determines the duty cycle of the first control signal according to the initial rotational speed and the first preset rotational speed range to be reached by the permanent magnet synchronous motor within the first preset time period. In this case, the electronic speed controller may determine the duty cycle of the first control signal according to an actual rotational speed of the permanent magnet synchronous motor.

Step 303: After the first preset time period ends, the electronic speed controller sends a second control signal to the permanent magnet synchronous motor, the second control signal being used to control the permanent magnet synchronous motor to stop rotating within a second preset time period.

Exemplarily, after the first preset time period ends, the rotational speed of the permanent magnet synchronous motor is within the first preset rotational speed range. Further, the electronic speed controller may send the second control signal to the permanent magnet synchronous motor. The second control signal may control the permanent magnet synchronous motor to stop rotating within the second preset time period.

In the permanent magnet synchronous motor, a braking torque generated based on the first control signal is less than a braking torque generated based on the second control signal. The braking torque generated based on the second control signal may make the permanent magnet synchronous motor stop rotating in a short time. Stopping rotation herein means that the rotational speed of the permanent magnet synchronous motor is 0, or the rotational speed is insufficient to drive the propeller. Therefore, an effect that when observed with naked eyes, the multiple permanent magnet synchronous motors are synchronously braked, that is, the propellers simultaneously stop rotating is achieved.

Exemplarily, a duty cycle of the second control signal may be preset.

In this embodiment of the present application, after receiving the signal for braking multiple permanent magnet synchronous motors sent by the flight controller, the electronic speed controller may send the first control signal to a permanent magnet synchronous motor of the multiple permanent magnet synchronous motors. The first control signal may be used to control the permanent magnet synchronous motor to decrease its rotational speed to the preset rotational speed range within the first preset time period. After the first preset time period ends, the electronic speed controller may further send the second control signal to the permanent magnet synchronous motor. The second control signal may be used to control the permanent magnet synchronous motor to stop rotating within the second preset time period. According to the foregoing manner, consistency of shutdown of multiple motors can be ensured, thereby avoiding different losses of multiple motors, ensuring flight balance of the drone, and improving use experience of the drone.

Figure 4:
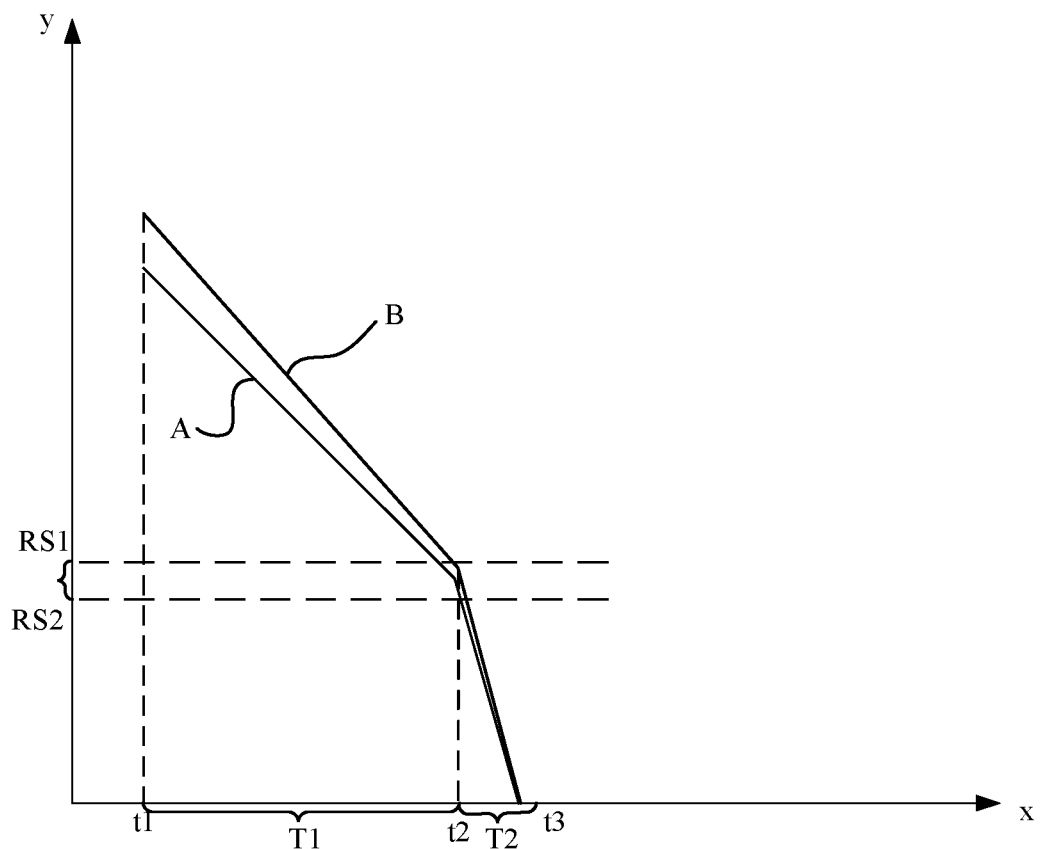
FIG. 4 is a schematic diagram of rotational speed changes after multiple permanent magnet synchronous motors receive a control signal according to an embodiment of the present application.

The foregoing implementation is described below with reference to FIG. 4. FIG. 4 is a schematic diagram of rotational speed changes after multiple permanent magnet synchronous motors receive a control signal according to an embodiment of the present application.

As shown in FIG. 4, an x axis indicates a time, and a y axis indicates a rotational speed of a permanent magnet synchronous motor. A curve A indicates a rotational speed change curve of a permanent magnet synchronous motor A, and a curve B indicates a rotational speed change curve of a permanent magnet synchronous motor B. Certainly, the drone may include multiple permanent magnet synchronous motors for driving propellers, and only two of the multiple permanent magnet synchronous motors are used herein as an example for description.

The two permanent magnet synchronous motors may be controlled by an electronic speed controller or each may be controlled by a corresponding electronic speed controller. This is not limited herein.

As shown in FIG. 4, at an initial moment t1, an initial rotational speed of the permanent magnet synchronous motor A is different from an initial rotational speed of the permanent magnet synchronous motor B. A time period T1 from the moment t1 to a moment t2 is the first preset time period. A time period T2 from the moment t2 to a moment t3 is the second preset time period. A curve, corresponding to the time period T1, in the curve A is a rotational speed decrease curve of the permanent magnet synchronous motor A under control of the first control signal. Similarly, a curve, corresponding to the time period T1, in the curve B is a rotational speed decrease curve of the permanent magnet synchronous motor B under control of the first control signal. Within the time period T1, the permanent magnet synchronous motor A and the permanent magnet synchronous motor B both generate a first braking torque based on the first control signal, causing rotational speeds of the permanent magnet synchronous motor A and the permanent magnet synchronous motor B to decrease. An action time period of the first braking torque is the time period T1. Under action of the first control signal, rotational speeds, corresponding to the moment t2, in the curves A and B all fall within the preset rotational speed range. In FIG. 4, the preset rotational speed range is embodied as a rotational speed range from a rotational speed RS1 to a rotational speed RS2. From the moment t2, the permanent magnet synchronous motor A and the permanent magnet synchronous motor B are both controlled by the second control signal and generates a second braking torque based on the second control signal, causing the permanent magnet synchronous motor A and the permanent magnet synchronous motor B to stop rotating. An action time period of the second braking torque is the time period T2. The second braking torque is greater than the first braking torque. According to the foregoing manner, as shown in the figure, the permanent magnet synchronous motor A and the permanent magnet synchronous motor B can be made to stop rotating almost at the same time. Further, multiple motors can be synchronously shut down by using control signals in two phases.

Figure 5:
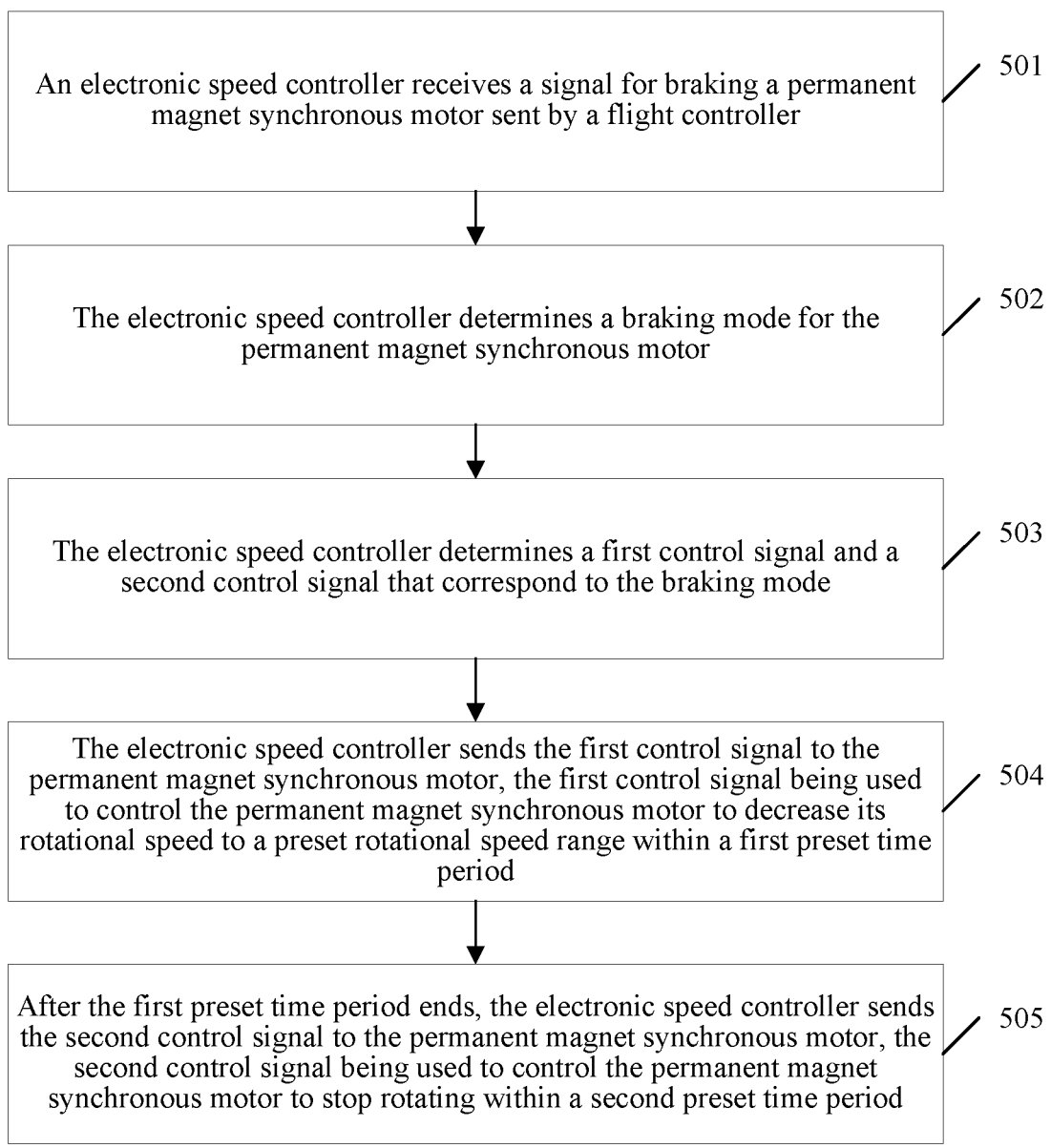
FIG. 5 is a schematic flowchart of another method for braking a permanent magnet synchronous motor according to an embodiment of the present application.

Referring to FIG. 5, FIG. 5 is a schematic flowchart of another method for braking a permanent magnet synchronous motor according to an embodiment of the present application. As shown in FIG. 5, the method includes at least the following steps:

Step 501: An electronic speed controller receives a signal for braking a permanent magnet synchronous motor sent by a flight controller.

Step 502: The electronic speed controller determines a braking mode for the permanent magnet synchronous motor.

Exemplarily, the braking mode may be indicated by the flight controller by using the braking signal, or may be preset. This is not limited therein. The braking mode may include dynamic braking, reverse braking, regenerative braking and the like. This is not limited herein.

Step 503: The electronic speed controller determines a first control signal and a second control signal that correspond to the braking mode.

Exemplarily, different braking modes may correspond to different first control signals and second control signals.

For example, in a dynamic braking mode, a duty cycle of a control signal is in proportion to a braking torque that is generated by the permanent magnet synchronous motor based on the control signal. In this case, a duty cycle of the first control signal is less than a duty cycle of the second control signal, so that a first braking torque is less than a second braking torque of the permanent magnet synchronous motor. The first braking torque is generated by the permanent magnet synchronous motor based on the first control signal, and the second braking torque is generated by the permanent magnet synchronous motor based on the second control signal.

Alternatively, in a regenerative braking mode, a duty cycle of a control signal is in inverse proportion to a braking torque that is generated by the permanent magnet synchronous motor based on the control signal. In this case, a duty cycle of the first control signal is greater than a duty cycle of the second control signal.

Step 504: The electronic speed controller sends the first control signal to the permanent magnet synchronous motor, the first control signal being used to control the permanent magnet synchronous motor to decrease its rotational speed to a preset rotational speed range within a first preset time period.

Step 505: After the first preset time period ends, the electronic speed controller sends the second control signal to the permanent magnet synchronous motor, the second control signal being used to control the permanent magnet synchronous motor to stop rotating within a second preset time period.

A specific implementation of generating the braking torque by the permanent magnet synchronous motor based on the control signal is described below with reference to FIG. 2.

Figure 2:
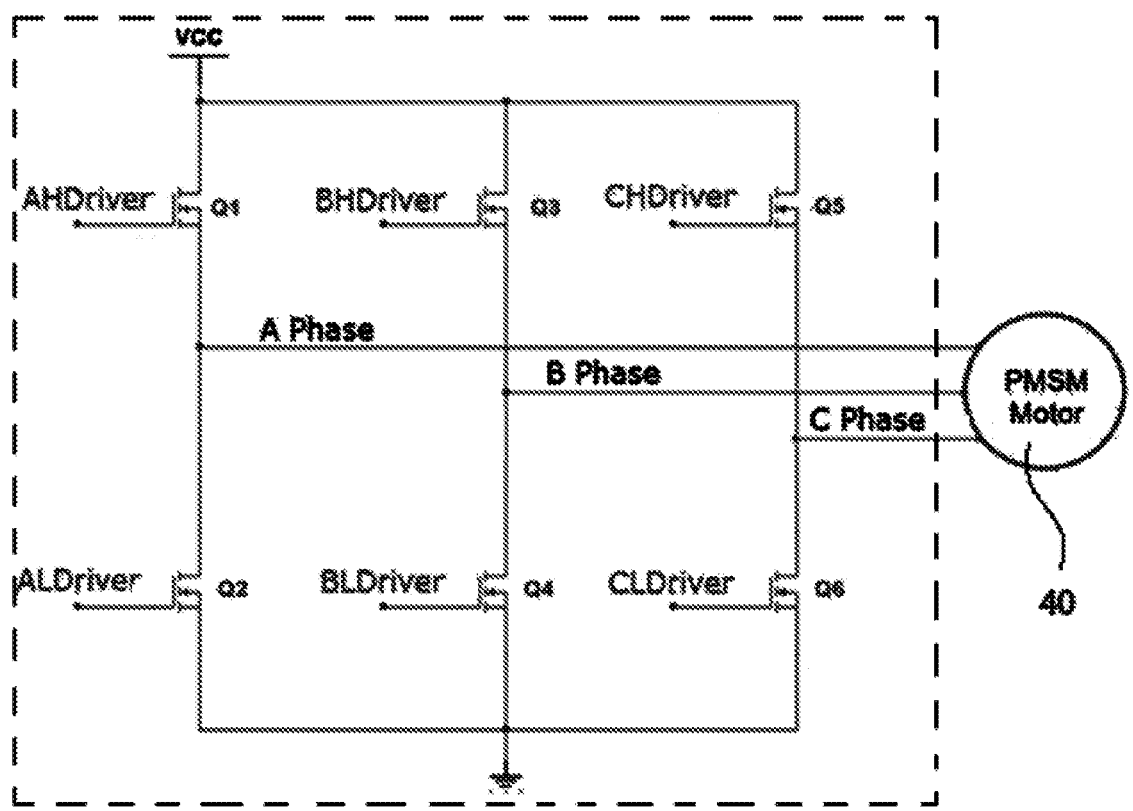
FIG. 2 is a schematic diagram of a drive circuit of a three-phase permanent magnet synchronous motor according to an embodiment of the present application.

Referring to FIG. 2, FIG. 2 is a schematic diagram of a drive circuit of a permanent magnet synchronous motor. The drive circuit may be a three-phase full-bridge circuit. The first control signal and the second control signal control, by controlling one or more of drive switches Q1 to Q6 in the drive circuit to be closed, the permanent magnet synchronous motor to generate the braking torque. AHDriver, ALDriver, BHDriver, BLDriver, CHDriver and CLDriver are respectively control signal input ends of the dive switches.

When sending the first control signal to the permanent magnet synchronous motor, the electronic speed controller may respectively input the first control signal into the ALDriver, the BLDriver and the CLDriver ends. At the same time, the drive switches Q1, Q3 and Q5 are closed. Therefore, under driving of the first control signal, the drive switches Q2, Q4 and Q6 are simultaneously conducted and closed. When the drive switches Q2, Q4 and Q6 are conducted, three phases A, B and C of the permanent magnet synchronous motor are short-circuited, so that stator windings of the motor forms a current loop, and a braking current is generated under driving of a back electromotive force of the windings, so as to generate the first braking torque, preventing a rotor connected to a propeller from rotating. An action time period of the first control signal is the first preset time period.

After the first preset time period ends, the second control signal can make the permanent magnet synchronous motor generate the second braking torque in two different action manners.

Manner 1: The second control signal may be used to control the three phases of the permanent magnet synchronous motor to be short-circuited. As shown in FIG. 2:

The duty cycle of the second control signal may be 100%, or the duty cycle of the second control signal may be set to enable the three phases A, B and C of the permanent magnet synchronous motor to be short-circuited within the second preset time period. That is, the drive switches Q2, Q4 and Q6 are controlled to be conducted within the second preset time period. In this case, the permanent magnet synchronous motor generates the second braking torque according to energy consumption in the permanent magnet synchronous motor, so that the permanent magnet synchronous motor stops rotating under action of the second braking torque.

Manner 2: The second control signal may be used to control a braking current to be input into the three phases of the permanent magnet synchronous motor. The permanent magnet synchronous motor generates the second braking torque under action of the braking current, so that the permanent magnet synchronous motor stops rotating under action of the second braking torque.

According to the foregoing manner, the electronic speed controller can determine, based on different braking modes, the first control signal and the second control signal that correspond to the braking modes. Therefore, a control manner of the electronic speed controller is more flexible.

Figure 6:
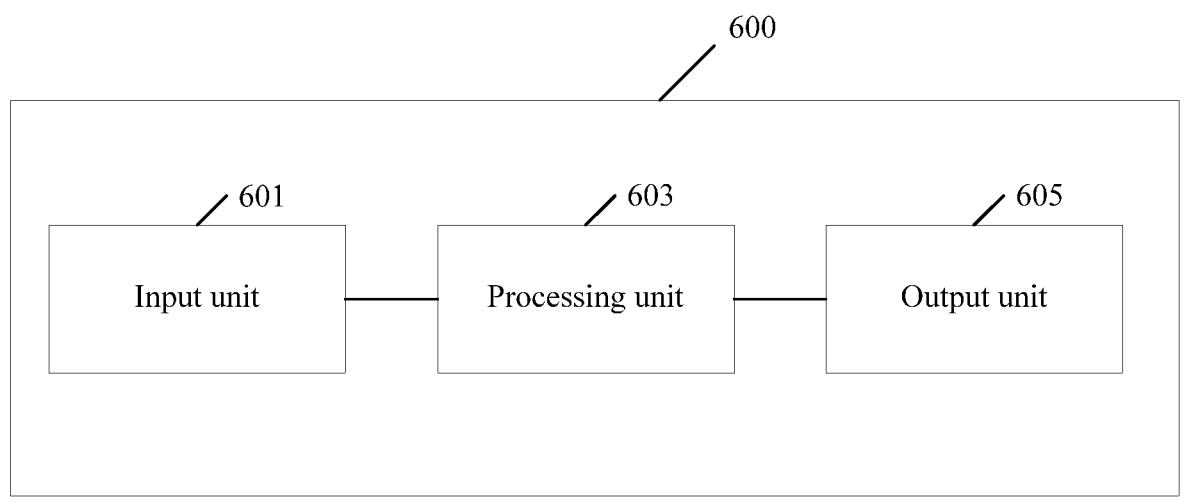
FIG. 6 is a composition diagram of units of an apparatus for braking a permanent magnet synchronous motor according to an embodiment of the present application.

Referring to FIG. 6, FIG. 6 is a composition diagram of units of an apparatus for braking a permanent magnet synchronous motor according to an embodiment of the present application. As shown in FIG. 6, the permanent magnet synchronous braking apparatus 600 may include an input unit 601, a processing unit 603 and an output unit 605.

The input unit 601 is configured to receive a signal for braking a permanent magnet synchronous motor sent by a flight controller.

The output unit 605 is configured to send a first control signal to the permanent magnet synchronous motor, the first control signal being used to control the permanent magnet synchronous motor to decrease its rotational speed to a preset rotational speed range within a first preset time period.

The output unit 605 is further configured to, after the first preset time period ends, send a second control signal to the permanent magnet synchronous motor, the second control signal being used to control the permanent magnet synchronous motor to stop rotating within a second preset time period.

Optionally, the processing unit 603 is configured to:
determine a braking mode for the permanent magnet synchronous motor; and
determine the first control signal and the second control signal that correspond to the braking mode.

Certainly, the foregoing functional units are further configured to perform any method performed by the electronic speed controller in the foregoing embodiment, and details are not described herein again.

Functions of the foregoing functional units may be implemented by a specific hardware structure of the electronic speed controller, by computer instructions stored in the electronic speed controller, or by a combination thereof. This is not limited herein.

Figure 7:
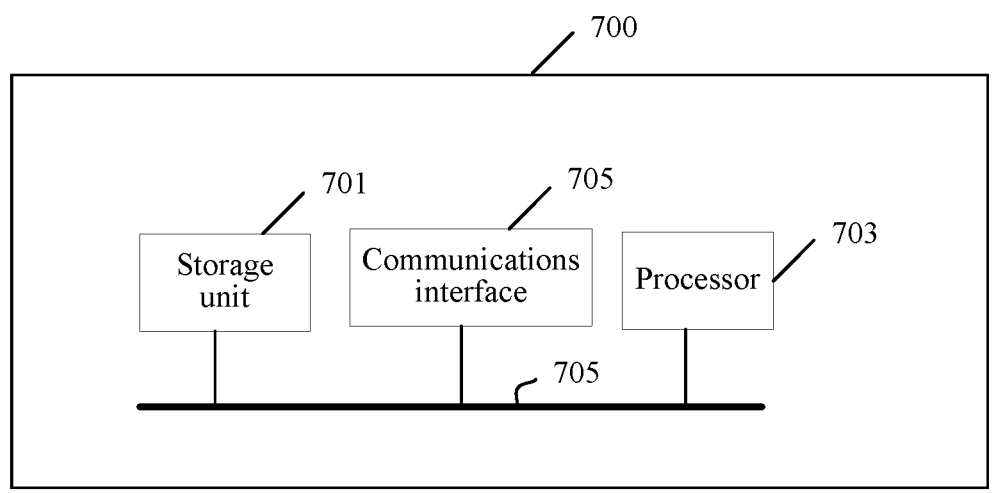
FIG. 7 is a schematic structural diagram of an electronic speed controller according to an embodiment of the present application.

Referring to FIG. 7, FIG. 7 is a schematic structural diagram of an electronic speed controller according to an embodiment of the present application. As shown in FIG. 7, the electronic speed controller 700 may include a memory 701, a processor 703 and a communications interface 705. The processor 703 is respectively coupled to the memory 701 and the communications interface 705.

The memory 701 is configured to store program code, computer instructions and data. The processor 703 is configured to invoke computer instructions and data to perform any method performed by the electronic speed controller. The communications interface 705 is configured to exchange signals with a flight controller or a permanent magnet synchronous motor under control of the processor 703.

The processor 703 may further include a central processing unit (CPU). Alternatively, the processor 703 may be understood as a controller.

The memory 701 may include a read-only memory and a random access memory and provides instructions, data and the like to the processor 703. A part of the memory 701 may further include a non-volatile random access memory. In a specific application, all components are coupled together by using, for example, a bus system. The bus system may include not only a data bus, but also a power supply bus, a control bus, a state signal bus and the like. However, for clear description, in the figure, all buses are marked as the bus system 707.

The method disclosed in the foregoing embodiments of the present invention may be implemented by the processor 703. The processor 703 may be an integrated circuit chip having a signal processing capability. In an implementation process, steps of the foregoing method may be completed by using an integrated logic circuit of hardware in the processor 703 or an instruction in a form of software. The processor 703 may be a general purpose processor, a digital signal processor, an application-specific integrated circuit, a field programmable gate array or another programmable logic device, a discrete gate or transistor logic device, or a discrete hardware component. The processor 703 may implement or perform the methods, steps and logical block diagrams disclosed in the embodiments of the present invention. The processor 703 may be an image processor or a microprocessor, or the processor may alternatively be any regular processor, or the like. Steps of the methods disclosed with reference to the embodiments of the present invention may be directly implemented by using a hardware decoding processor, or implemented by using a combination of hardware and software modules in a decoding processor. The software module may be located in a mature storage medium in the art, such as a random access memory, a flash memory, a read-only memory, a programmable read-only memory, or an electrically erasable programmable memory, or a register. The storage medium is located in the memory 701. For example, the processor 703 may read program code, computer instructions, or data in the memory 701 and implement the steps of the foregoing method performed by the electronic speed controller in combination with hardware thereof.

The foregoing descriptions are merely implementations of the present invention but are not intended to limit the patent scope of the present invention. Any equivalent modifications made to the structures or processes based on the content of the specification and the accompanying drawings of the present invention for direct or indirect use in other relevant technical fields shall also be encompassed in the patent protection scope of the present invention.

What is claimed is:

1. A method for braking multiple permanent magnet synchronous motors, applied to an electronic speed controller, comprising:
   determining a braking mode for the multiple permanent magnet synchronous motors;
   receiving a signal for braking the multiple permanent magnet synchronous motors sent by a flight controller;
   determining a duty of a first control signal and a duty of a second control signal that correspond to the braking mode to enable a braking torque based on the first control signal to be less than a braking torque based on the second control signal;
   sending the first control signal to the multiple permanent magnet synchronous motors, the first control signal being used to control the multiple permanent magnet synchronous motors to decrease their rotational speeds to a preset rotational speed range within a first preset time period; and after the first preset time period ends, sending the second control signal to the multiple permanent magnet synchronous motors, the second control signal being used to control the multiple permanent magnet synchronous motors to stop rotating within a second preset time period.

2. The method according to claim 1, wherein
in response to the braking mode being dynamic braking, the duty cycle of the first control signal is less than the duty cycle of the second control signal; and
in response to the braking mode being regenerative braking, the duty cycle of the first control signal is greater than the duty cycle of the second control signal.

3. The method according to claim 1, wherein
the duty cycle of the first control signal is determined according to the first preset time period and the preset rotational speed range; or
the duty cycle of the first control signal is determined according to an initial rotational speed of the multiple permanent magnet synchronous motors, the first preset time period and the first preset rotational speed range.

4. The method according to claim 1, wherein
the second control signal is used to control three phases of the multiple permanent magnet synchronous motors to be short-circuited, to control the multiple permanent magnet synchronous motors to stop rotating within the second preset time period; or
the second control signal is used to control a braking current to be input into the three phases of the multiple permanent magnet synchronous motors, to control the multiple permanent magnet synchronous motors to stop rotating within the second preset time period.

5. The method according to claim 1, wherein the receiving the signal for braking the multiple permanent magnet synchronous motors sent by the flight controller comprises:
receiving the signal for braking the multiple permanent magnet synchronous motors sent by the flight controller; and
the sending the first control signal to the multiple permanent magnet synchronous motors comprises:
sending the first control signal to at least one permanent magnet synchronous motor of the multiple permanent magnet synchronous motors.

6. The method according to claim 5, wherein the electronic speed controller is configured to control the at least one permanent magnet synchronous motor; and
the sending the first control signal to the at least one permanent magnet synchronous motor of the multiple permanent magnet synchronous motors comprises:
sending the first control signal to the at least one permanent magnet synchronous motor controlled by the electronic speed controller.

7. An electronic speed controller, comprising:
a memory; and
a processor coupled to the memory, wherein
the memory is configured to store computer instructions; and
the processor is configured to:
determine a braking mode for the multiple permanent magnet synchronous motors;
receive a signal for braking multiple permanent magnet synchronous motors sent by a flight controller;
determine a duty of a first control signal and a duty of a second control signal that correspond to the braking mode to enable a braking torque based on the first control signal to be less than a braking torque based on the second control signal;
send the first control signal to a permanent magnet synchronous motor of the multiple permanent magnet synchronous motors, the first control signal being used to control the multiple permanent magnet synchronous motors to decrease their rotational speeds to a preset rotational speed range within a first preset time period; and
after the first preset time period ends, send the second control signal to the multiple permanent magnet synchronous motors, the second control signal being used to control the multiple permanent magnet synchronous motors to stop rotating within a second preset time period.

8. The electronic speed controller according to claim 7, wherein
in response to the braking mode being dynamic braking, the duty cycle of the first control signal is less than the duty cycle of the second control signal; and
in response to the braking mode being regenerative braking, the duty cycle of the first control signal is greater than the duty cycle of the second control signal.

9. The electronic speed controller according to claim 7, wherein
the duty cycle of the first control signal is determined according to the first preset time period and the preset rotational speed range; or
the duty cycle of the first control signal is determined according to an initial rotational speed of the multiple permanent magnet synchronous motors, the first preset time period and the first preset rotational speed range.

10. The electronic speed controller according to claim 7, wherein the second control signal is used to control three phases of the multiple permanent magnet synchronous motors to be short-circuited, to control the multiple permanent magnet synchronous motors to stop rotating within the second preset time period; or
the second control signal is used to control a braking current to be input into the three phases of the multiple permanent magnet synchronous motors, to control the multiple permanent magnet synchronous motors to stop rotating within the second preset time period.

11. The electronic speed controller according to claim 7, wherein there are at least two permanent magnet synchronous motors, and the processor is further configured to:
receive the signal for braking the multiple permanent magnet synchronous motors sent by the flight controller; and
send the first control signal to at least one permanent magnet synchronous motor of the multiple at least two permanent magnet synchronous motors.

12. The electronic speed controller according to claim 11, wherein the electronic speed controller controls the at least one permanent magnet synchronous motor, and the processor is further configured to:
send the first control signal to the at least one permanent magnet synchronous motor controlled by the electronic speed controller.

13. A drone, comprising:
a central housing;
an arm, connected to the central housing;
a permanent magnet synchronous motor, disposed on the arm;
a flight controller, disposed in the central housing or the arm; and
an electronic speed controller, disposed in the central housing or the arm, electrically connected to the flight controller, and electrically connected to the permanent magnet synchronous motor;

wherein the flight controller is configured to send a signal for braking the multiple permanent magnet synchronous motors to the electronic speed controller; and the electronic speed controller is configured to:

determine a braking mode for the multiple permanent magnet synchronous motors;

receive a signal for braking multiple permanent magnet synchronous motors sent by a flight controller;

determine a duty of a first control signal and a duty of a second control signal that correspond to the braking mode to enable a braking torque based on the first control signal to be less than a braking torque based on the second control signal;

send the first control signal to the multiple permanent magnet synchronous motors, the first control signal being used to control the multiple permanent magnet synchronous motors to decrease their rotational speeds to a preset rotational speed range within a first preset time period; and after the first preset time period ends, send Rail the second control signal to the multiple permanent magnet synchronous motors, the second control signal being used to control the multiple permanent magnet synchronous motors to stop rotating within a second preset time period.

14. The drone according to claim 13, wherein in response to the braking mode being dynamic braking, the duty cycle of the first control signal is less than the duty cycle of the second control signal; and in response to the braking mode being regenerative braking, the duty cycle of the first control signal is greater than the duty cycle of the second control signal.

15. The drone according to claim 14, wherein the duty cycle of the first control signal is determined according to the first preset time period and the preset rotational speed range; or the duty cycle of the first control signal is determined according to an initial rotational speed of the multiple permanent magnet synchronous motors, the first preset time period and the first preset rotational speed range.

16. The drone according to claim 13, wherein the second control signal is used to control three phases of the multiple permanent magnet synchronous motors to be short-circuited, to control the permanent magnet synchronous motor to stop rotating within the second preset time period; or the second control signal is used to control a braking current to be input into the three phases of the multiple permanent magnet synchronous motor, to control the multiple permanent magnet synchronous motor to stop rotating within the second preset time period.

17. The drone according to claim 4, wherein the electronic speed controller is further configured to:

receive the signal for braking the permanent magnet synchronous motors sent by the flight controller; and send the first control signal to at least one permanent magnet synchronous motor of the permanent magnet synchronous motors.

* * * * *